US006254713B1

(12) United States Patent
Riehle

(10) Patent No.: US 6,254,713 B1
(45) Date of Patent: Jul. 3, 2001

(54) METHOD FOR PRODUCING A COMPOSITE-LIKE INFORMATION CARRIER

(75) Inventor: Harald Riehle, Esslingen (DE)

(73) Assignee: IWA F. Riehle GmbH, Denkendorf (DE)

( * ) Notice: Subject to any disclaimer, the term of this patent is extended or adjusted under 35 U.S.C. 154(b) by 0 days.

(21) Appl. No.: 09/184,333

(22) Filed: Nov. 2, 1998

(30) Foreign Application Priority Data

Oct. 31, 1997 (DE) .............................................. 197 48 157

(51) Int. Cl.$^{7}$ .............................. B32B 31/00; G06G 1/06

(52) U.S. Cl. .......................... 156/256; 156/269; 156/270; 156/277; 156/513; 235/70 R; 40/491; 40/492; 40/495

(58) Field of Search .................................... 156/256, 270, 156/269, 268, 277, 513, 264; 235/70 R; 40/491, 492, 495

(56) References Cited

U.S. PATENT DOCUMENTS 3,881,817 * 5/1975 Kidd et al. ............................ 355/12
4,538,055 8/1985 Riehle ................................ 235/70 R
5,851,333 * 12/1998 Fagnant et al. ...................... 156/252

FOREIGN PATENT DOCUMENTS 92 03 396 U 6/1992 (DE) .
62-219183 * 9/1987 (JP) .

* cited by examiner

*Primary Examiner*—Linda L Gray
(74) *Attorney, Agent, or Firm*—Jones, Tullar & Cooper, P.C.

(57) ABSTRACT

A method for producing a composite layer-like information carrier with an upper and a lower cover layer (6) and a center intermediate layer (6), having two parallel separating slits extending through it in the longitudinal direction, so that a sliding tongue is formed, which can be moved in the longitudinal direction, wherein the information can be viewed through a transparent section in the cover layer; in order to execute the method efficiently, it comprises the following method steps:

making available sheets constituting the upper and the lower cover layer and of a sheet constituting the intermediate layer, cutting a plurality of separating slits, which extend one behind the other in the longitudinal direction, and are aligned with each other and are separated by a strip, in several parallel rows, in the intermediate layer, layered arrangement and connection of the sheets in areas outside of the parallel separating slits, each of which delimits a respective sliding tongue, and cutting the composite layer structure formed in this way in such a way, that the cut, which delimits an information carrier transversely in respect to the longitudinal direction (8) respectively intersects the separating slits of the latter, so that the connection of the sliding tongue to the sheet constituting the intermediate layer is severed.

17 Claims, 4 Drawing Sheets

Fig.1
(PRIOR ART)
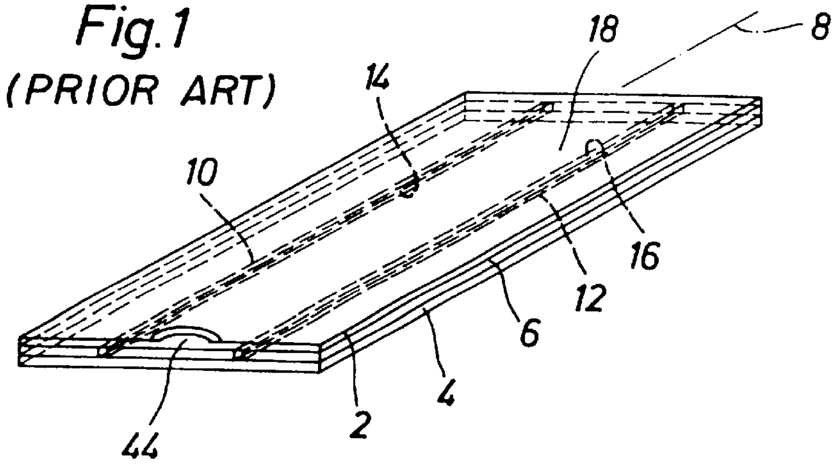
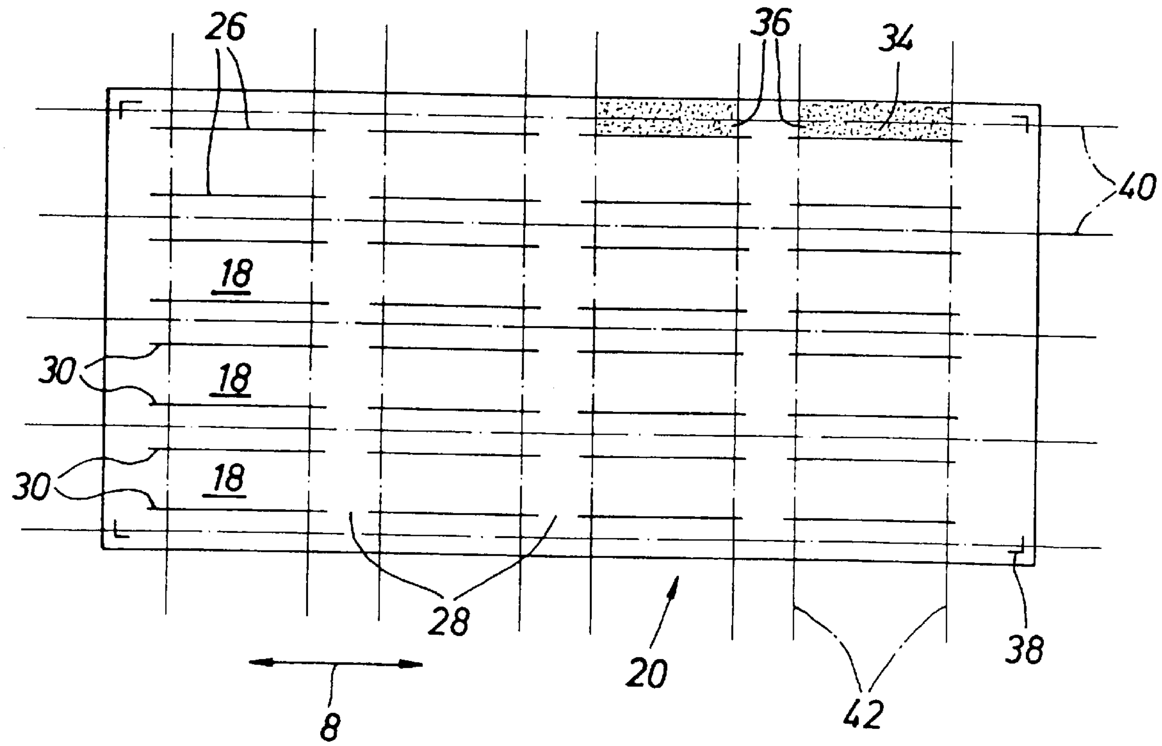
Fig. 2

METHOD FOR PRODUCING A COMPOSITE-LIKE INFORMATION CARRIER

BACKGROUND OF THE INVENTION

The present invention relates to a method for producing a composite layer-like information carrier with an upper and a lower cover layer and a center intermediate layer having two parallel separating slits extending through it in the longitudinal direction, so that a sliding tongue is formed, which can be moved in the longitudinal direction, wherein the pieces of information are provided with a defined association by an appropriate positioning of the sliding tongue with in respect to the cover layer and in particular can be viewed through a window-like recess or a transparent section in the cover layer.

Such an information carrier is known, for example, from German Patent DE 31 48 355 C2. The basic method for producing such an information carrier is described in this document. Based on this, it is the object of the present application to make the manufacture of such information carriers even more cost-effective and therefore more efficient.

SUMMARY OF THE INVENTION

This object is attained in accordance with the present invention by a method with the following method steps:

- making available sheets constituting the upper and the lower cover layer and a sheet constituting the intermediate layer, whose length, and preferably also whose width is a multiple of the length, or respectively the width, of the information carrier to be produced,
- cutting a plurality of separating slits, which extend one behind the other in the longitudinal direction, are aligned with each other and are separated by a strip, in several parallel rows, in the sheet constituting the intermediate layer,
- layered arrangement and connection of the sheets in areas outside of the parallel separating slits, each of which delimits a respective sliding tongue,
- cutting the composite layer structure formed in this way and containing a matrix-like arrangement of information carriers to be produced in such a way, that the cut, which delimits an information carrier transversely with respect to the longitudinal direction respectively intersects the separating slits of the latter, so that the connection of the sliding tongue to the sheet constituting the intermediate layer is severed.

Thus, by means of the present invention it is possible in a particularly advantageous manner to produce a plurality of information carriers in one work step by making available sheets constituting the several layers, and cutting the separating slits, as well as by layering, connecting and cutting the sheets.

By means of this it is possible to produce a considerably larger number of information carriers in one work step, so to speak.

It has been shown to be particularly advantageous if C-shaped or V-shaped stamped cuts are made in the sheets constituting the upper and/or the lower cover layer, which in the course of cutting the composite layer structure are intercepted by a cut delimiting the information carrier transversely with respect to the longitudinal direction and in this way form recesses open toward the edge in the cover layer(s), which permit grasping the sliding tongue in a very comfortable way. To this end the sheets are stamped in accordance with a predetermined pattern.

The slits are milled, preferably with a slit width of 0.05 to 0.2 mm, most preferably of approximately 0.1 mm, in a manner known per se by means of small circular saw blades. By means of this it is possible to achieve an exact parallelism of the separating surfaces located across from each other, or respectively facing each other, of the center layer. The roughness of the surface generated by this has an advantageous effect in that it is suitable for storing sliding means, which possibly have been added.

Markings are provided on the sheets in an advantageous manner, which are used as positioning aids in the course of the composite-like arrangement of the sheets on top of each other.

The sheets on which the information carriers to be produced are provided in the form of quasi matrix elements, are preferably printed with information before they are connected with each other.

Adhesive methods, arbitrary per se, have proven themselves for connecting the sheets with each other, such as gluing, high frequency or ultrasonic welding, even riveting or, if metals are used, spot welding. With sheets made of paper or plastic materials, however, the connection by means of an adhesive is given preference. In an advantageous manner the adhesive can be applied in a pressure process. In this case it has been shown to be advantageous if only one sheet, namely the sheet which constitutes the intermediate layer, is coated on both sides with adhesive.

In accordance with a preferred further development of the method in accordance with the present invention it is proposed that more than two parallel separating slits per information carrier to be produced are made in the intermediate layer, so that several sliding tongues per information carrier are delimited. This opens the option of producing information carriers with respectively several slides in one production step.

In accordance with a further embodiment variant, an even number of parallel separating slits per information carrier to be produced is cut into the intermediate layer, wherein respectively two separating slits are associated with each other and delimit one sliding tongue, and wherein an intermediate strip remains between the sliding tongues, which is connected with the sheets constituting the upper and the lower cover layer.

In accordance with a preferred embodiment variant, at least one of the separating slits delimiting a sliding tongue is made with a step-shaped offset, or respectively is cut into the sheet constituting the intermediate layer. This step-shaped offset then can form a detent area, which prevents the unintentional pulling of the sliding tongue out of the information carrier to be produced. To achieve such a security in both directions, it is proposed that adjoining the step-shaped offset a partial section be cut out of the sheet constituting the intermediate layer, wherein the longitudinal extension of this partial section defines the possible displacement path of the detent area and thus of the sliding tongue.

In accordance with a further advantageous concept of the present invention, the step-shaped offset is formed between two adjoining sliding tongues, so that a pulling means is formed which, when the one sliding tongue is displaced in at least one direction, takes the other along.

In accordance with a further, particularly preferred method variant, several sheets constituting intermediate layers are made available and provided with separating slits; thereafter the sheets are arranged on top of each other in such a way that the separating slits of the one sheet extend at an angle with respect to the separating slits of the other sheet, wherein the angle advantageously will be 90°. It is possible in this way to produce information carriers with sliding tongues which can be displaced at an angle to each other.

But the present invention also relates to a method for producing a composite-like information carrier with an upper and a lower cover layer and a center intermediate layer which, by the application of a circle-shaped separating slit, forms a circular plate except for a cut off edge area and guides it rotatably between the cover layers, wherein the plate can be viewed through a recess in one of the cover layers and can be manually grasped, and wherein the pieces of information have a defined association by means of an appropriate positioning of the plate in relation to the cover layer. Such an information carrier had been described in Applicant's not pre-published patent application No. 197 36 161.7.

It is also an object of the present invention to recite a production method for this information carrier, which can be cost-effectively performed.

This further object is attained by a method with the following method steps:

- making available sheets constituting the upper and the lower cover layer and a sheet constituting the intermediate layer, whose length and/or width is a multiple of the length, or respectively the width, of the information carrier to be produced,
- cutting a plurality of separating slits in the shape of an arc of a circle in the sheet constituting the intermediate layer which, however, are not turned back into each other, so that the plates in the form of circular disks being created in the process remain connected to the sheet by at least one segment of the arc of the circle,
- layered arrangement and connection of the sheets in areas outside of the separating slits which delimit the plates in the shape of circular disks,
- cutting the composite layer structure formed in this way and constituting a matrix-like arrangement of information carriers to be produced in such a way, that the cut, which delimits an information carrier, severs the connection of the plate with the center sheet, so that the separating slit terminates in this cutting plane and the plate is maintained captively and rotatably between the cover layers.

Further characteristics, details and advantages of the present invention ensue from the drawing representation and following description of a preferred embodiment of the production method in accordance with the present invention.

BRIEF DESCRIPTION OF THE DRAWINGS

FIG. 1, is a perspective plan view of an information carrier produced in accordance with composite layer structure technology, FIG. 2, is a view from above on a sheet constituting an intermediate layer of the information carrier with separating slits indicated.

DESCRIPTION OF THE PREFERRED EMBODIMENTS

Figure 3:
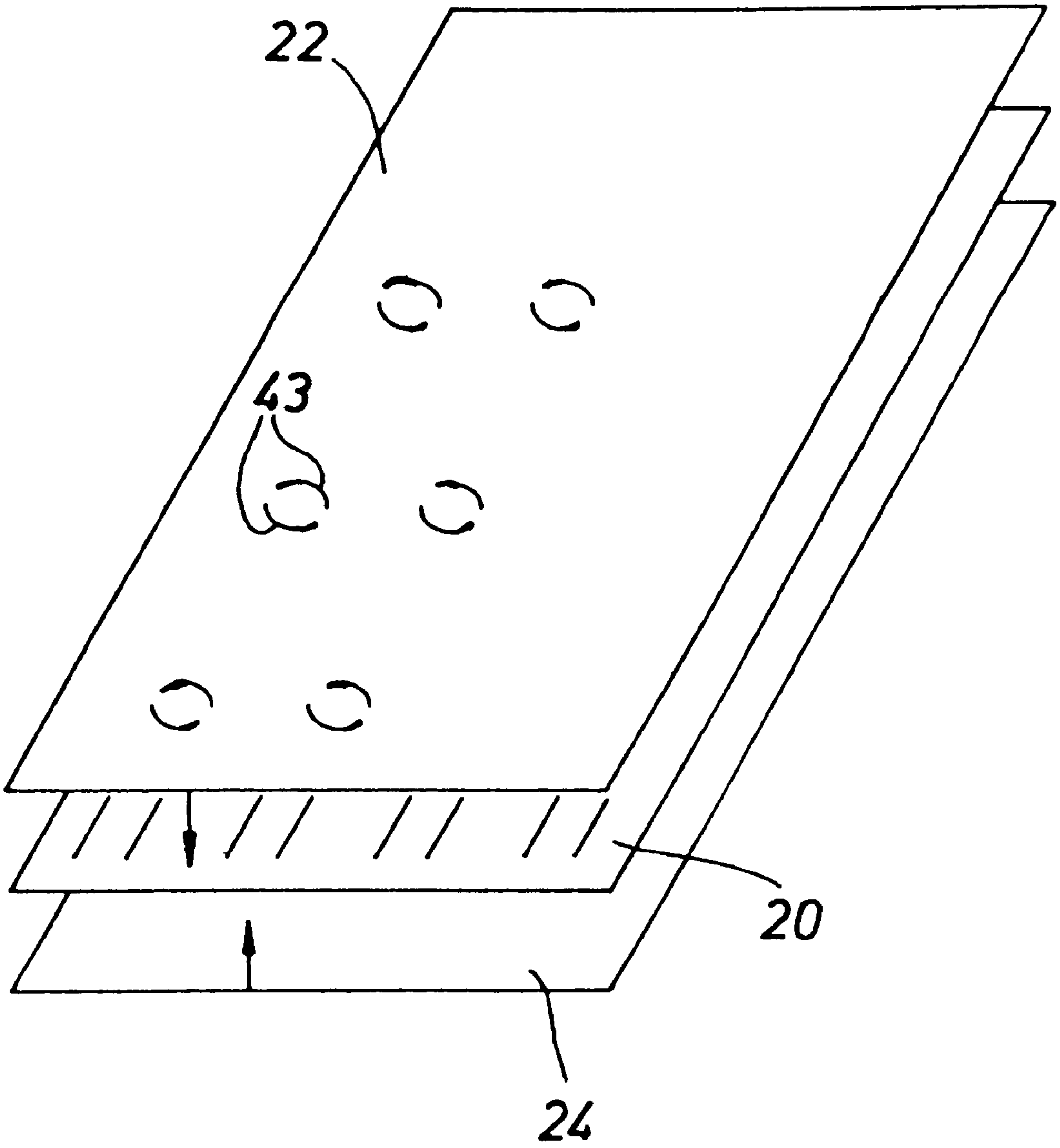
FIG. 3, is a schematic perspective plan view of the arrangement of the cover layers and the intermediate layer for forming the information carrier in accordance with FIG. 1, FIG. 4, is a perspective plan view of a second embodiment of an information carrier produced in accordance with composite layer structure technology.

FIG. 1 represents a perspective plan view of an information carrier, known per se, with an upper cover layer 2 and a lower cover layer 4 and a center intermediate layer 6, which are fixedly connected, in particular glued together. Separating slits 10, 12 are provided in the intermediate layer 6 parallel with the longitudinal direction of the information carrier, which are embodied to be continuous in the longitudinal direction and therefore define a sliding tongue 18 delimited between the cover layers 2, 4 and the lateral faces 14, 16 formed by the separating slits 10, 12.

FIG. 2 shows a view from above on a sheet 20 constituting the intermediate layer 6 of a plurality of information carriers. Furthermore, sheets 22, 24, shown in FIG. 3, are made available, preferably in a printed state, for forming the upper cover layer 2, or respectively the lower cover layer 4 of the information carriers.

The sheet 20 constituting the intermediate layer 6 has a plurality of separating slits 26, which are arranged one behind the other in the longitudinal direction of the information carrier to be produced, and which are spaced apart by unseparated or uncut areas 28. Respectively one pair 30 of these separating slits 26 constitutes the separating slits 10, 12 and delimits a sliding tongue 18 of a respective information carrier. But in the representation in FIG. 2, the respective sliding tongue 18 is still connected with the sheet 20.

In an advantageous manner, the sheet 20 can be printed with information, and also with an adhesive, in those areas which come to lie outside of the separating slits 26 and the sliding tongues 18 to be produced. In an advantageous manner, the adhesive application can be made in the form of strips 34, which are continuous in the longitudinal direction 8, as indicated by the reference numeral 36.

Finally, the sheets 20, 22, 24, which are preferably printed with information, are arranged on top of each other, wherein printed markings 38 are used as positioning aids. By applying pressure and, if required, heat, the sheets 20, 22, 24 are connected with each other by bonding.

The composite layer structures formed in this manner are finally cut by cutting lines 40, 42 which, in the represented case, extend vertically in relation to each other. In this case the cutting lines 42 extending transversely in relation to the longitudinal direction 8 intersect the separating slits 26, because of which the connection of the sliding tongues 18 with the sheet 20 is severed. The sliding tongues 18 are guided, freely movable, in the longitudinal direction of the respective information carrier.

If, as indicated in FIG. 3, stamped out sections 43 are provided in one of both cover layers 22, 24, which are also covered by the separating cuts 42, a recess 44 FIG. 1, open towards the edge, results in the cover layers 22, 24 in the area of the longitudinal end of the sliding tongue 18. The sliding tongue 18 can then be comfortably grasped by hand and pulled out of the composite.

Figure 4:
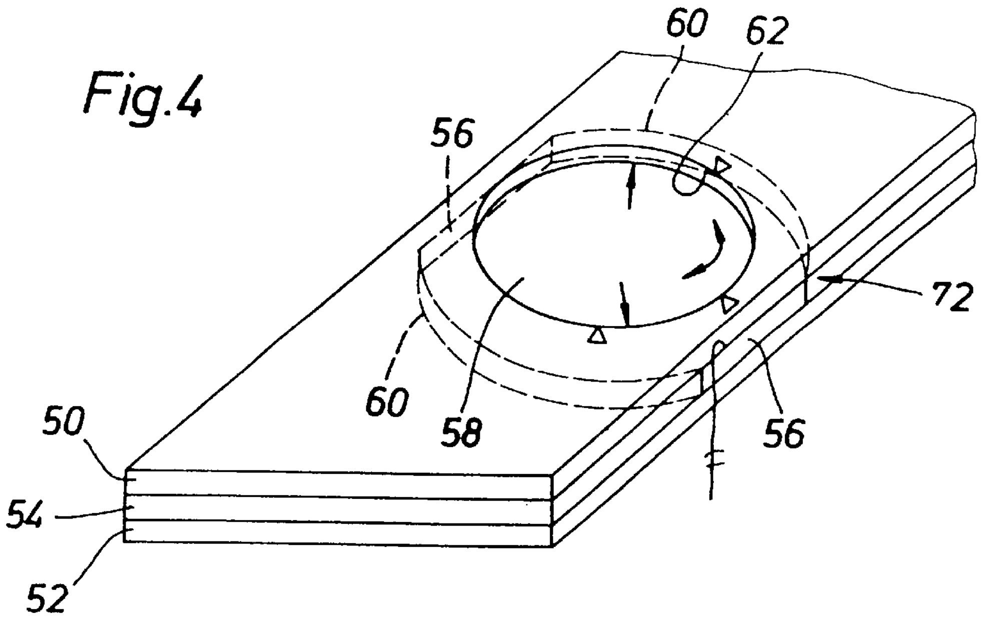

FIG. 4 shows a schematic plan view of a further embodiment of an information carrier 72 with an upper and lower cover layer 50, 52 and a center intermediate layer 54. A plate 58 which, except for cut off edge sections 56 is in the shape of a circular disk and is formed from the material of the intermediate layer 54, is rotatably received between the cover layers 50, 52. The plate 58 is formed from the material of the intermediate layer 54 by a separating slit 60 in the shape of an arc of a circle. A recess 62 is provided in the cover layer 50, which permits a view on the rotatable plate 58 and the information provided thereon.

Figure 5:
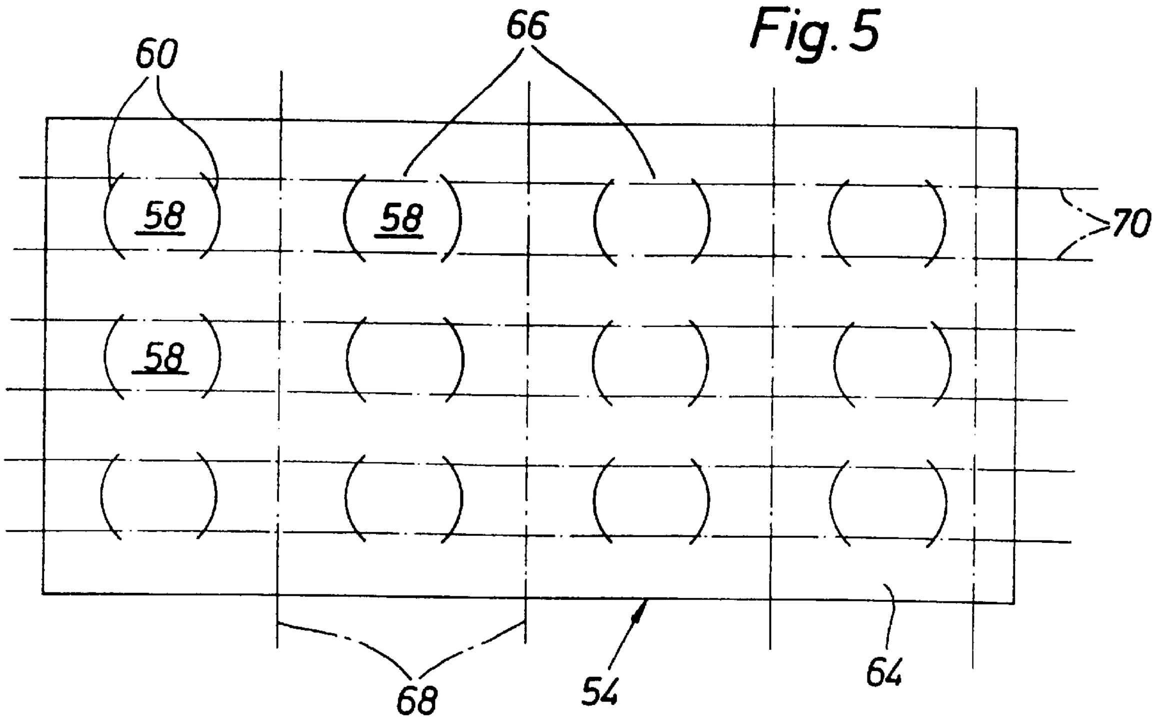
FIG. 5, is a view from above on a sheet constituting the intermediate layer of the information carrier in accordance with FIG. 4 with separating slits indicated.

FIG. 5 shows a view from above on a sheet 64 constituting the intermediate layers 54 for producing a plurality of information carriers. A plurality of separating slits 60 in the shape of arcs of a circle is provided in the sheet 64 which, however, are not closed in themselves in the shape of arcs of a circle. The approximately semicircularly shaped separating slits 60 end at a distance from each other. The plate 58, which is defined by them and is exactly in the shape of a circular disk, is connected to the sheet 64 by means of this distance area 66. It is now possible to arrange the sheet 64 in the manner corresponding to FIG. 2 between two sheets which constitute the respective cover layers 50, 52 of the information carrier, and are connected with the latter in a permanent manner.

Separating cuts 68, 70, which again extend perpendicularly with respect to each other, are now made through the composite layer structures made in this way. The separating cuts 70 intersect the separating slits 60, so that the latter terminate in the respective cutting plane (FIG. 4). By means of this the plate 58 is received captively and rotatably between the cover layers 50, 52.

FIG. 6 again shows a view from above on a sheet 82 constituting an intermediate layer 80 with the course of the separating slits only indicated twice. Three separating slits 84 per information carrier to be produced, which are aligned with each other but are interrupted in the longitudinal direction, can be perceived. The center separating slit 84 is embodied with a step-shaped offset 86 in that in this area the separating slit extends perpendicularly in relation to its longitudinal extent. By means of this two sliding tongues 88 and 90 are formed by the total of three separating slits 84 per information carrier to be produced, which are coupled with each other in respectively one displacement direction via the step-shaped offset 86. If, for example as in the representation of FIG. 6, following the formation of a composite layer structure and cutting of the composite layer structure along the indicated cutting lines 92, or respectively 94, an upper sliding tongue 88 is pulled toward the right out between the cover layers, the sliding tongue 90 is taken along in this direction. When pushing the sliding tongue 88 back, however, the sliding tongue 90 remains in its position. The sliding tongue 90 acts in a corresponding manner in the opposite direction.

Figure 6:
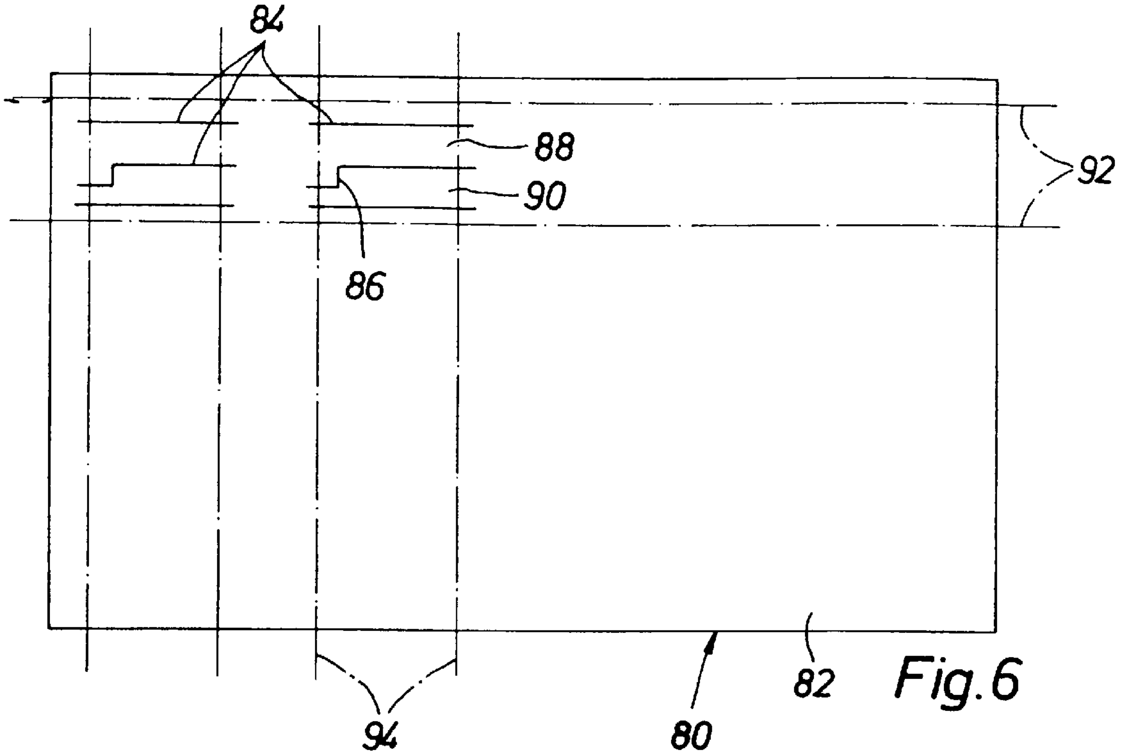
FIG. 6, is a view from above on a sheet constituting the intermediate layer for the production of information carriers with respectively two sliding tongues.
Figure 7:
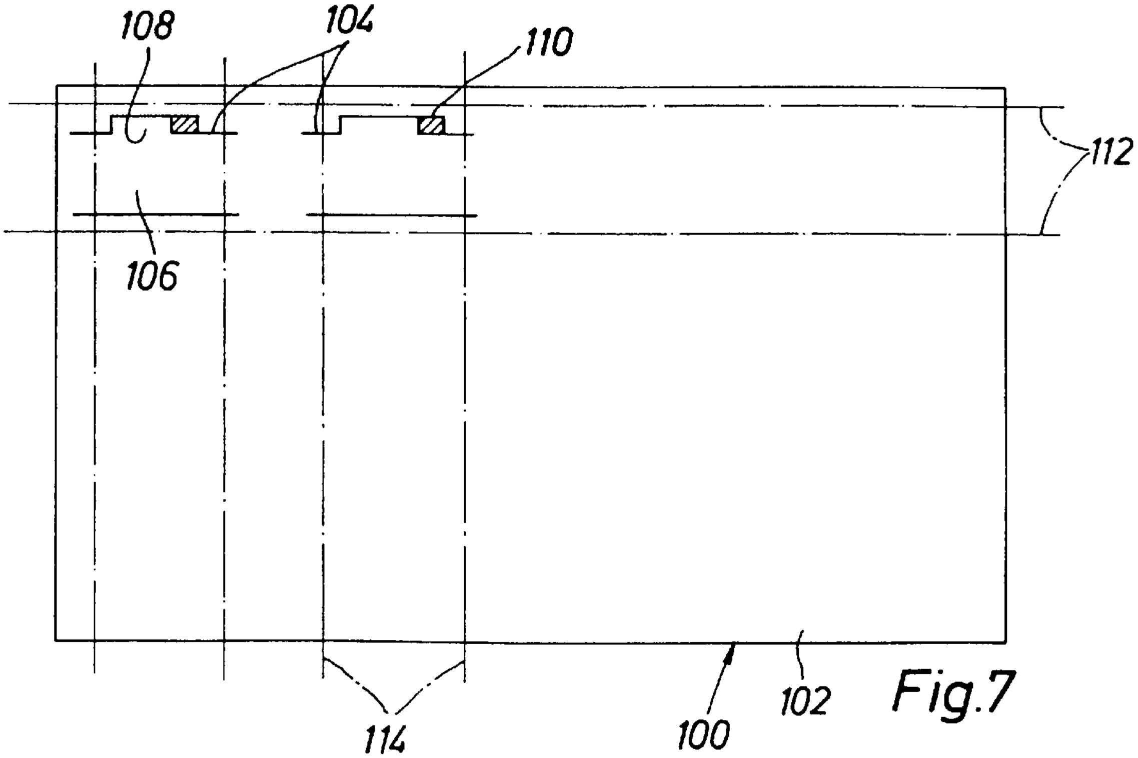
FIG. 7, is a view from above on a sheet constituting the intermediate layer for the production of information carriers with a sliding tongue which can be displaced only to a limited degree.

FIG. 7 shows a further embodiment of a sheet 102 constituting an intermediate layer 100 with a path of the separating slits 104 corresponding to the one indicated in FIG. 6. Respectively one of the separating slits 104 delimiting a respective sliding tongue 106 has a step-shaped offset 108, wherein the step-shaped offset has the approximate shape of a square pulse. In addition, adjoining the step-shaped offset 108 a partial section 110 has been cut out of the sheet 102. Following the making of a composite layer structure and cutting of the composite layer structure along cutting lines 112 and 114, a limited displaceability of a respective sliding tongue 106 in relation to the composite layer structure has been achieved in this way, because the step-shaped detent area can only be displaced over the length of the cut-out partial section 110. Thus, the respective sliding tongue 106 is captively received in the composite layer structure of the information carrier to be produced.

It is understood that it is also possible to create information carriers with intermediate layers constituting several sliding tongues. In such a case several sheets constituting intermediate layers are made available and are separately provided with an appropriate separating slit arrangement, wherein the separating slits of the various sheets preferably extend perpendicularly with respect to each other, so that following layering and connection of the sheets perpendicularly with respect to each other displaceable sliding tongues are formed, which permits a complex information conveyance.

What is claimed is:

1. A method for producing a plurality of composite layered information carriers having: an upper cover layer; a lower cover layer; and a center intermediate layer, each defining a longitudinal direction, the center intermediate layer having two parallel separating slits extending through it in the longitudinal direction so that a sliding tongue is formed which can be moved in the longitudinal direction; and a recess or a transparent section in one of the cover layers, wherein pieces of information are provided with a defined association by an appropriate positioning of the sliding tongue with respect to the cover layers, and can be viewed through the recess or transparent section, the method comprising the steps of:

- making available sheets constituting the upper and lower cover layers and a sheet constituting the center intermediate layer, the sheets having at least one of a length and width which is a multiple of the length, or respectively the width, of the information carrier to be produced;
- cutting a plurality of separating slits in the center intermediate layer to extend one behind the other in the longitudinal direction, to be aligned with each other and to be separated by a nonslit portion between which aligned slits form several parallel rows;
- forming a composite layered arrangement of the upper cover layer, the lower cover layer and the center intermediate layer with the cut plurality of separating slits, using for this purpose markings provided on the sheets as positioning aids in the course of forming the composite layered arrangement and connecting the layers outside of the separating slits, forming a matrix arrangement of information carriers; and
- cutting the composite layered arrangement transversely to the longitudinal direction and such as to intersect the separating slits forming thereby as many information carriers as there are in the matrix arrangement, each including a sliding tongue formed in the center intermediate layer.

2. The method as defined in claim 1, further comprising the step of:

- cutting one of a C-shaped and V-shaped stamped cuts in the upper cover layer and the lower cover layer which form recesses open toward the edge of the information carrier when the composite layered arrangement is cut transversely to the longitudinal direction, the recesses permitting grasping of the associate sliding tongue.

3. The method as defined in claim 1, wherein the separating slits are milled.

4. The method as defined in claim 1, further comprising the step of:

- printing the upper cover layer, the lower cover layer and the center intermediate layer before formation of the composite layered arrangement.

5. The method as defined in claim 1, further comprising the step of:

coating at least some of the layers with an adhesive.

6. The method as defined in claim 5, wherein only the center intermediate layer is coated with an adhesive on both sides.

7. The method as defined in claim 1, wherein more than two parallel separating slits are formed in the center intermediate layer so that several sliding tongues per information carrier are formed.

8. The method as defined in claim 7, wherein an even number of parallel separating slits are formed in the center intermediate layer with an intermediate strip between sliding tongues formed by two respective separating shots, and wherein the intermediate strips are connected with the upper cover layer and the lower cover layer.

9. The method as defined in claim 1, wherein at least one of the separating slits is made with a step-shaped offset which forms a detent area.

10. The method as defined in claim 9, further comprising the step of:

cutting a partial section out of the center intermediate layer adjoining each step-shaped offset, defining thereby a displacement path of a detent area.

11. The method as defined in claim 9, wherein each step-shaped offset is formed between two adjoining sliding tongues, so that a pulling means is formed which, when the one sliding tongue is displaced, takes the other along.

12. The method as defined in claim 1, wherein several center intermediate layers are made available each with separating slits, the sheets are arranged on top of each other so that the separating slits of one layer extend at an angle to the separating slits of the other layer.

13. The method as defined in claim 1, wherein the cutting is performed by water jet separation.

14. The method as defined in claim 1, wherein the cutting is performed by laser jet separation.

15. A method for producing a plurality of composite layered information carriers having: an upper cover layer; a lower cover layer; a center intermediate layer having a circle-shaped separating slit forming a circular disk except for a cut off edge area which is rotatably guided between the upper cover layer and the lower cover layer; and a recess in one of the cover layers for viewing the circular plate, wherein the pieces of information contained on the information carrier have a defined association by an appropriate positioning of the circular disk in relation to the upper cover layer and the lower cover layer, the method comprising the steps of:

making available sheets constituting the upper and lower cover layers and a sheet constituting the center intermediate layer, the sheets having at least one of a length and width which is a multiple of the length, or respectively the widths of the information carrier to be produced;

cutting a plurality of separating slits in the shape of an arc of a circle in the center intermediate layer so that plates in the form of circular disks are formed which remain connected to the center intermediate layer by at least one segment of the arc of the circle where the slits are separated by a nonslit portion;

forming a composite-layered arrangement of the upper cover layer, the lower cover layer and the center intermediate layer with the cut plurality of separating slits, and connecting the upper and lower layers outside of the separating slits forming a matrix arrangement of information carriers; and cutting the composite layered arrangement so that the separating slits terminate in a cutting plane and so to separate the plate from the center layer at the at least one segment to form the circular disks maintained captively and rotatably between the upper cover layer and the lower cover layer and cutting the composite layered arrangement transversely to the cutting plane in the nonslit portions forming thereby as many information carriers as there are in the matrix arrangement of information carriers, each including a circular disk formed in the center layer.

16. The method as defined in claim 15, wherein the cutting is performed by water jet separation.

17. The method as defined in claim 15, wherein the cutting is performed by laser jet separation.

* * * * *